April 21, 1959     W. G. HEINARD     2,883,628
REVERSE DIRECTION WAVEGUIDE COUPLER
Filed June 25, 1957
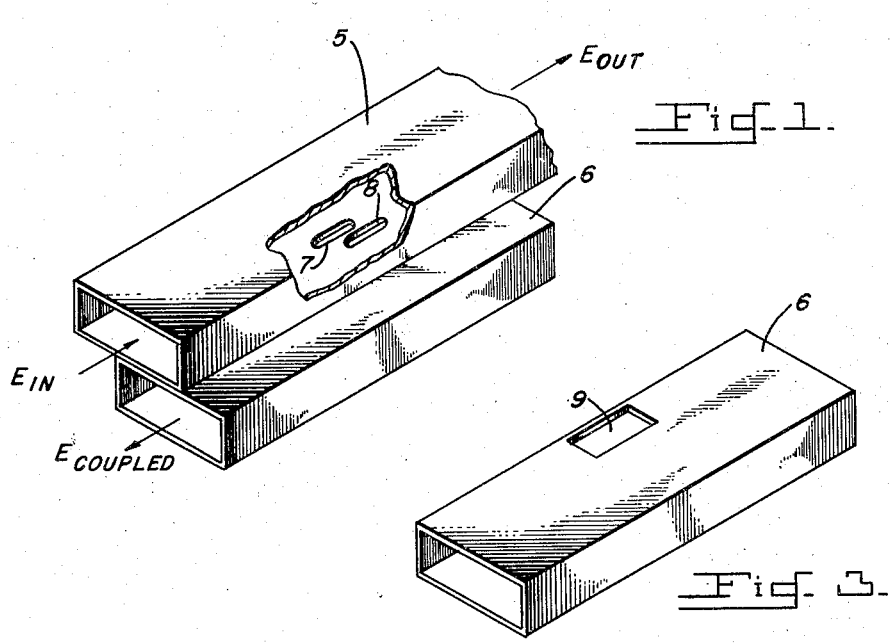
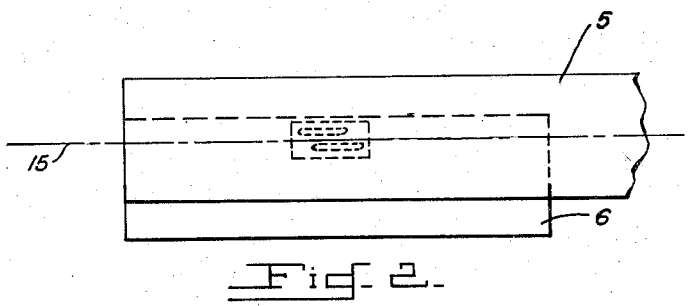
INVENTOR.
Whilden G. Heinard

United States Patent Office 2,883,628
Patented Apr. 21, 1959

2,883,628

REVERSE DIRECTION WAVEGUIDE COUPLER

Whilden G. Heinard, Kensington, Md., assignor to the United States of America as represented by the Secretary of the Army Application June 25, 1957, Serial No. 668,003

2 Claims. (Cl. 333—10)

(Granted under Title 35, U.S. Code (1952), sec. 266)

The invention described herein may be manufactured and used by or for the Government for governmental purposes without the payment to me of any royalty thereon.

This invention relates to waveguide couplings, and more particularly to couplings where energy is coupled in a rearward direction.

A known coupling for attaining rearward coupling has a broad face of one waveguide section adjacent to a narrow face of a second waveguide section. This design is unsatisfactory where height is limited. The minimum height is obtained when a broad face of one waveguide section is adjacent to the broad face of another waveguide section. When broad faces of two waveguides are adjacent and the narrow sides are flush, zero energy is propagated into the coupled arm. This invention accomplishes satisfactory performance with broad faces adjacent by offsetting the two waveguides so that the energy passes from the transmitting waveguide into the coupled waveguide near a narrow face of the coupled waveguide. Said coupled energy is propagated in the direction of the source.

An object of this invention is a waveguide coupling with broad faces adjacent whereby energy is coupled in the direction of the source.

Another object of this invention is a waveguide coupling having the minimum height possible.

The specific nature of the invention, as well as other objects, uses, and advantages thereof, will clearly appear from the following description and from the accompanying drawing, in which:

Figure 1 is a schematic view of a coupling in accordance with the invention.

Figure 2 is a plan view of the coupling of Figure 1.

Figure 3 is a schematic view of a waveguide section into which energy is to be coupled.

In Figures 1 and 2, a waveguide 5 is adapted to transmit energy of the $TE_{0,1}$ mode at X-band frequency. Waveguide 5 is coupled to a waveguide 6 so that the broad faces of said waveguides are adjacent. The bottom face of waveguide 5 has slots 7 and 8 which are elongated in the direction of energy transmission. The slots 7 and 8 are on opposite sides of the longitudinal axis 15 of waveguide 5 (Fig. 2). The slots may be considered negligible in width and their respective longitudinal center lines spaced from one another a relatively small distance. These two dimensions are not considered critical. The upper face of waveguide 6 has an aperture 9 adjacent to a side wall as is shown in Figure 3. Waveguide 5 is offset from waveguide 6 so that slots 7 and 8 are coincident with aperture 9.

By varying the length and position of slots 7 and 8, the amount of transmittal coupled energy can be varied. By adjusting the longitudinal distance between slots 7 and 8, the phase of the energy waves can be made to reinforce or cancel in waveguide 6. In the embodiment shown, the waves reinforce in the backward direction and cancel in the forward direction. This was accomplished by having the longitudinal distance between the centers of slots 7 and 8 approximately .325 of a wave length. Said coupled energy is propagated back to the source.

As an example and in no sense limiting, the following results have been obtained in the X-band frequency by the present invention. With slot lengths ranging from .309 to .339 of a wavelength, coupling can be varied from approximately 20 db to approximately 27 db with an input VSWR of less than 1.1. In all cases the directivity was at least 10 db and the waveguides approximately .5 in. by 1 in. in cross-sectional dimensions.

It will be apparent that the embodiment shown is only exemplary and that various modifications can be made in construction and arrangement within the scope of the invention as defined in the appended claims.

I claim:

1. A reverse direction waveguide coupler comprising: a first rectangular waveguide section wherein waveguide energy is adapted to be propagated, said first waveguide section having two longitudinal slots spaced on opposite sides of the center line of a broad face thereof, a second waveguide section having an aperture on one side of the center line of a broad face thereof, said waveguide sections coupled so that their longitudinal axes are parallel and the broad faces thereof having slots and apertures are adjacent, said waveguide sections being offset so that the longitudinal slots are coincident with said aperture, said aperture having dimensions sufficient to enclose said longitudinal slots, the longitudinal distance between said slots adjusted so that the waves coupled into said second waveguide section from said first waveguide section reinforce in the direction opposite to the direction of propagation of the waves in said first waveguide section, and cancel in the same direction as the direction of propagation of the waves in said first wavegiude section.

2. The invention in accordance with claim 1 wherein said reverse direction coupler is adapted for X-band operation, and wherein the longitudinal distance between said slots is approximately .325 of a wavelength.

References Cited in the file of this patent

UNITED STATES PATENTS

| | | |
|---|---|---|
| 2,627,573 | Riblet | Feb. 3, 1953 |
| 2,636,082 | Saad | Apr. 21, 1953 |

FOREIGN PATENTS

| | | |
|---|---|---|
| 669,463 | Great Britain | Apr. 2, 1952 |